US007703121B2

(12) United States Patent
Vau et al.

(10) Patent No.: US 7,703,121 B2
(45) Date of Patent: Apr. 20, 2010

(54) METHOD OF DISTRIBUTING MULTIMEDIA DATA TO EQUIPMENT PROVIDED WITH AN IMAGE SENSOR

(75) Inventors: Jean-Marie Vau, Paris (FR); Olivier M. Rigault, La Celle St Cloud (FR); Nicolas P. Touchard, Suresnes (FR)

(73) Assignee: Eastman Kodak Company, Rochester, NY (US)

( * ) Notice: Subject to any disclaimer, the term of this patent is extended or adjusted under 35 U.S.C. 154(b) by 381 days.

(21) Appl. No.: 11/720,013

(22) PCT Filed: Nov. 28, 2005

(86) PCT No.: PCT/EP2005/012671

§ 371 (c)(1),
(2), (4) Date: May 23, 2007

(87) PCT Pub. No.: WO2006/058678

PCT Pub. Date: Jun. 8, 2006

(65) Prior Publication Data

US 2008/0003989 A1    Jan. 3, 2008

(30) Foreign Application Priority Data

Dec. 3, 2004    (FR)    .................................. 04 12814

(51) Int. Cl.
*H04N 7/173*    (2006.01)
*H04N 5/232*    (2006.01)
(52) U.S. Cl. .................................. 725/105; 348/211.3
(58) Field of Classification Search ............ 348/333.02, 348/207.1, 207.11, 211.99, 211.1, 211.2, 348/211.3, 211.4, 211.5, 211.14; 725/105; 455/456.1–456.6
See application file for complete search history.

(56) References Cited

U.S. PATENT DOCUMENTS 4,652,733 A * 3/1987 Eng et al. .................... 235/375

(Continued)

FOREIGN PATENT DOCUMENTS

WO    WO 99/32960    7/1999

(Continued)

OTHER PUBLICATIONS

Daniel Wegner, "First Steps Towards Handheld Augmented Reality", Oct. 2003, Proceedings of the 7th IEEE International Symposium on Wearable Computers, IEEE Computer Society.*

*Primary Examiner*—Lin Ye
*Assistant Examiner*—Nelson D. Hernández Hernández
(74) *Attorney, Agent, or Firm*—William R. Zimmerli; Eugene I. Shkurkz

(57) ABSTRACT

A method of distributing multimedia data from a central distribution station to local equipment including: linking one image characteristic (32, 34, 36, 38, 40, 42, 44, 46, 48) with at least one set of multimedia data stored by the central distribution station respectively; making available to at least one user of a support (10) having at least one selection image (12, 14, 16, 18, 20, 22) in response to the capture of at least one image of the support by the local equipment, and calculating a characteristic of the captured image; searching for a multimedia data set of the central station linked to the image characteristic closest to the characteristic calculated; transferring of the corresponding multimedia data to the local equipment.

11 Claims, 5 Drawing Sheets

U.S. PATENT DOCUMENTS

| | | | |
|---|---|---|---|
| 5,574,519 A | 11/1996 | Manico et al. | |
| 6,288,704 B1* | 9/2001 | Flack et al. | 345/158 |
| 6,408,301 B1 | 6/2002 | Patton et al. | |
| 6,674,923 B1 | 1/2004 | Shih et al. | |
| 6,707,581 B1 | 3/2004 | Browning | |
| 2002/0102966 A1* | 8/2002 | Lev et al. | 455/412 |
| 2002/0140988 A1 | 10/2002 | Cheatle et al. | |
| 2004/0046871 A1* | 3/2004 | Ichikawa et al. | 348/207.99 |
| 2004/0085455 A1 | 5/2004 | Silverstein | |

FOREIGN PATENT DOCUMENTS

| | | |
|---|---|---|
| WO | WO 00/75914 | 12/2000 |

\* cited by examiner

METHOD OF DISTRIBUTING MULTIMEDIA DATA TO EQUIPMENT PROVIDED WITH AN IMAGE SENSOR

FIELD OF THE INVENTION

The present invention relates to a method of distributing multimedia data and in particular distributing image data from a central distribution station towards local equipment provided with an image sensor. The invention has applications in the fields of use of portable equipment, such as mobile phones, that simultaneously integrate the functions of capturing and reproducing images and/or sound. Applications are also envisaged in the fields of medical imaging and in the field of distributing press information.

BACKGROUND OF THE INVENTION

The image and/or sound capture and reproduction capacities of mobile phones are reduced compared with those of dedicated equipment. However, they are constantly progressing. The same is true for other portable equipment such as organizers or digital cameras. Improvements of the image and/or sound capture and reproduction capacities has made this equipment a preferred interface for distributing multimedia data. Indeed, the above-mentioned portable equipment offers many functions formerly reserved for fixed personal computers. The reduced dimensions of portable equipment as well as their limited data storage and reproduction capacities are compensated for by their capacity to make communication links to various central distribution stations. Central distribution stations are equipped with servers intended to store, classify, sort, and possibly process the data, before distributing or redistributing it to portable equipment. Exchanges between portable equipment and personal computers are also possible according to comparable schemes.

In the following description, equipment such as telephones or the other devices mentioned above is designated as the "local equipment". Equipment intended to store data, and with which the local equipment may make communication links is designated as the "central station". A central station can be a computer or a server, for example.

The making available to users of an increasing amount of data through the communication possibilities of local equipment, causes difficulties of location, selection and access to the data that has to be distributed to the users. U.S. Pat. No. 6,707,581; U.S. Pat. No. 6,674,923, U.S. Pat. No. 2002/0140988, U.S. Pat. No. 6,408,301; U.S. 2004/0085455; U.S. Pat. No. 5,574,519; WO 99/32960; WO 00/75914 illustrate various aspects of image distribution, distributing data linked to images, and selecting data that has to be distributed.

U.S. Pat. No. 6,707,581, for example, describes local equipment capable of reading a uniform resource locator URL and receiving data via the Internet. U.S. Pat. No. 6,674,923 while not referring to local portable equipment, indicates the possibility of linking addresses or codes to the images of a photographic index sheet for retrieving the corresponding image data.

SUMMARY OF THE INVENTION

The object of the invention is to propose a method of distributing multimedia data that greatly facilitates the selection of the data that has to be distributed or reproduced.

It is also an object to make the performance of image or data selection, more user friendly. In a more finished form, the object is to make the selection operation fully automatic, so as not to require any explicit control by the user.

Yet another object is to propose a method enabling images given to a user to be enhanced with multimedia data automatically.

To achieve these objects, the invention has more precisely for object a method of distributing multimedia data from a central distribution station to local equipment, provided with an image sensor and means to make a link with the central distribution station; the method comprising:

a) the linking of at least one image characteristic with at least one set of multimedia data stored by the central distribution station respectively, b) the making available to at least one user of a support having at least one selection image representative of the multimedia contents and of which one part at least has the image characteristic, c) in response to the capture of an image of the support by the local equipment's sensor, the making of a communication link between the local equipment and the central distribution station, and the calculation of a characteristic of the captured image, d) the search for a multimedia data set of the central station linked to the image characteristic closest to the characteristic calculated in step c), e) the transfer of data of said multimedia data set to the local equipment, and their reproduction to the user in a perceptible form, using the local equipment.

The reproduction of the data in a perceptible form means, for example, displaying an image or video clip or reproducing sound. It can occur directly on a screen or loudspeaker of the local equipment or on another equipment item, near the user, and linked to the local equipment. For example, if the multimedia data contain images, these can be displayed on the small monitor screen of the mobile phone, or on a television which is locally linked in communication to the mobile phone. The connection is made, for example, according to the Bluetooth protocol.

One advantage of the invention is that it is no longer necessary for the user to enter a code or ID for identifying the image or multimedia data that they wish to receive. The user can even ignore the existence of multimedia content attached to an image that they are capturing by means of their local equipment. Indeed, making a communication link with the central distribution station and searching for multimedia data can take place automatically.

The digital multimedia data stored in the central station relate to multimedia objects such as images, sequences of images, text, sound, or combinations of these multimedia objects. The data are organized in data sets, which correspond, for example, to files or file sets.

Each data set is linked to an image characteristic, i.e. a characteristic that corresponds to an image, a set of images or to an image part. Image characteristics are a function of one or more parameters such as color or light components, spatial gradients of light intensity, spatial frequencies of light intensity, a card of outlines of shapes contained in the image, a segmentation of the image, a representation at low resolution of the image, etc.

In general, when a selection has to be made among a high number of data sets, the finer image characteristics are taken. In a more complicated way, all the image data, i.e. the pixels of a selected image from the support supplied to the user, can be taken as the image characteristic. The data of the same image at lower resolution can be also taken.

Conversely, when the selection is liable to be made among a restricted number of data sets, more summary characteristics, such as the intensity gradients or a card of outlines can be enough.

When the user captures an image from all or part of the support made available, one characteristic of the image they captured is calculated. This characteristic is compared with the characteristics of the memorized data set. Finally, the data of the set whose characteristic is nearest that of the image captured by the user are transmitted to the local equipment.

When the number of multimedia data sets present in the central distribution station is high, the search for the data can be performed in one data set subset only. The purpose of this measure is to reduce the calculation capacity required and increase the processing speed. Therefore, a data set subset can be linked to an identifier. For example, the subset of the data sets that can be selected from the same support given to a user can be linked to the same identifier. The identifier can be an alphanumeric code, barcode, or any other sign entered by the user, and communicated to the central distribution station to target the search for the multimedia data. The entry of the identifier can be manual, for example, on a keyboard of the local equipment, or automatic, in the manner of a barcode.

Another possibility consists in linking an image characteristic to a data set subset and in searching in the relevant subset when an image having this characteristic has been previously entered.

For example, the characteristic of an image set or of an overall image of the support can be linked to a subset of several data sets. When this overall image is identified, the next step of the method can include the sending of a message to the local equipment inviting the user to restrict the image capture field to identify particular images of the image set or the overall image. This aspect will be described in more detail with reference to the figures.

According to a particular implementation of the invention, the multimedia data relate to an image whose iconic contents correspond to the contents of the selected image appearing on the support sent to the user and in which only one part of the image is reproduced. The reproduced part is determined according to the position of the local equipment in relation to the support given to the user, so as to simulate navigation in an image with size greater than that of a screen used for the reproduction. This lets the user run over the image using the local equipment both as a checking instrument and as a magnifying glass.

The reproduction of the multimedia data can take place on the local equipment used for capturing the selection images but can also take place on another specific equipment, to which the local equipment transmits the data. For example, the local equipment can be a phonecam communicating with a monitor or a television. In this case, the reading of the selection images can take place using the phonecam while the reproduction of the images and sound can take place on the television.

Other characteristics and advantages of the invention will appear in the following description, with reference to the figures of the appended drawings. This description is given purely as an illustration and is not limiting.

DETAILED DESCRIPTION OF THE INVENTION

In the following description, identical, similar or equivalent parts of the various figures are marked with the same reference symbols to facilitate reference between the figures.

Figure 1:
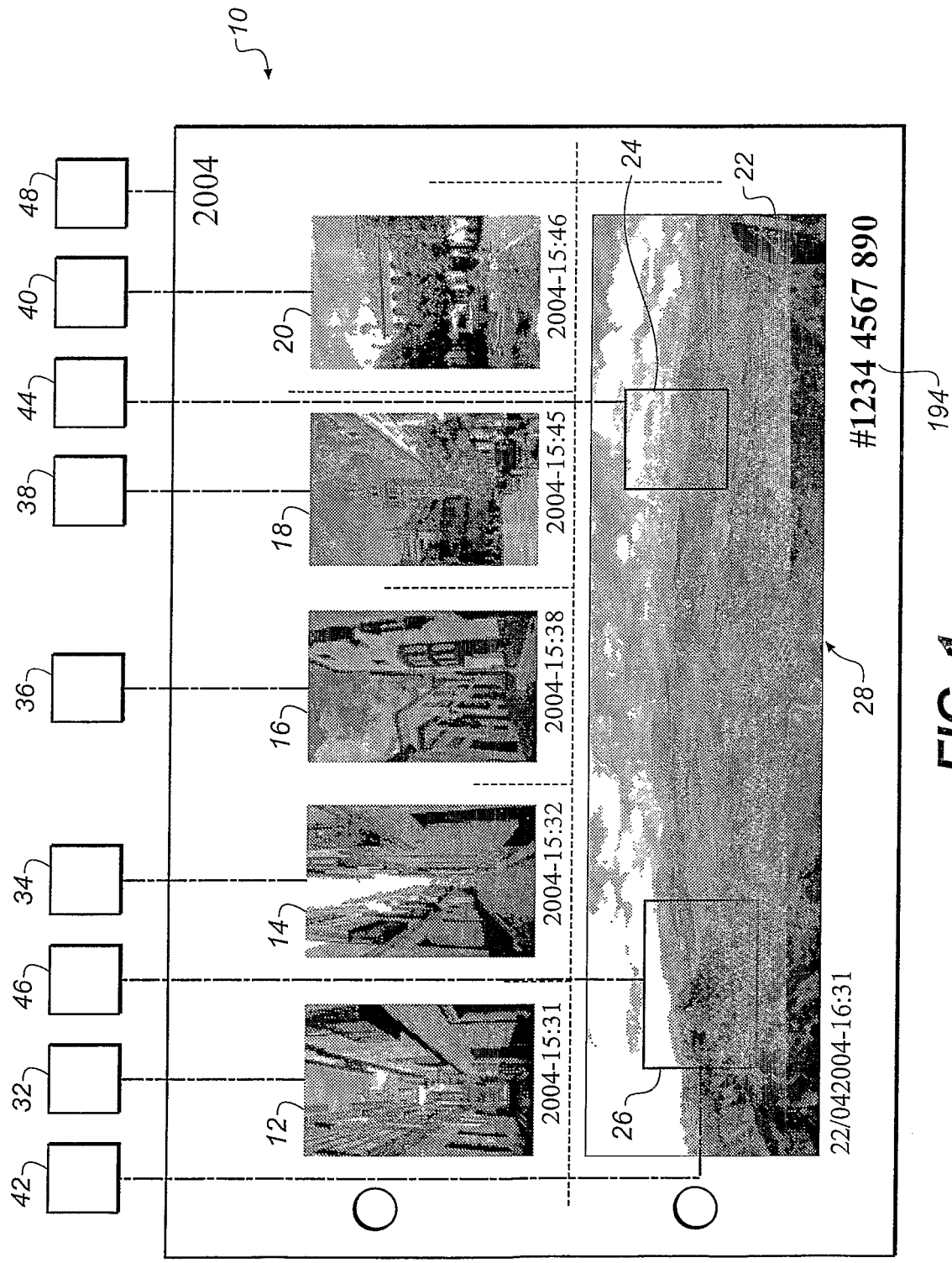
FIG. 1 shows a support capable of being sent to a user for implementing a method according to the invention.

FIG. 1 shows a support 10 capable of being sent to a user for implementing the method. In the example shown, this is an index sheet, comparable to those that may be found accompanying photographic prints. The support 10 can also be a newspaper, magazine or any type of readable information support, whether or not on paper.

The support contains several selection images 12, 14, 16, 18, 20, 22. In this case they are photos. Each selection image of the support corresponds to one or more multimedia objects. More commonly, a selection image can correspond to the digital data of the photograph it represents. A selection image can also correspond to the data of a video sequence containing many images. In this case, the selection image present on the support 10 represents, for example, one of the images of the video sequence so that the user can easily identify the relevant video sequence.

The selection images can also represent text data, sound or voice data, or any type of multimedia data capable of being reproduced in a perceptible way by the local equipment or by the dedicated equipment communicating with the local equipment. Although it does not constitute an essential characteristic of the invention, the images of the support 10 of FIG. 1 represent photos. In this case, they are photos with limited resolution (thumbnails).

It should be noted that sets of multimedia data can be linked to a selection image 12, 14, 16, 18, 20, 22, to part of the selection image 24, 26 or to a set of selection images 28 of the support.

Each of the selection images of the support has image characteristics that are specific to it. For example, these are its spatial intensity gradients, its color components or any other characteristic capable of being calculated from the image data captured by the local equipment. The characteristic capable of being created for each image, each image part or each image set, is symbolically shown on FIG. 1 by a small square 32, 34, 36, 38, 40, 42, 44, 46, 48. The references given to the image characteristics are obtained by adding 20 to the references of the corresponding images or image parts. For example, characteristic 48 corresponds to all the selection images 28 of the support, characteristic 42 corresponds to selection image 22 and characteristic 46 corresponds to selection image part 26.

Figure 2:
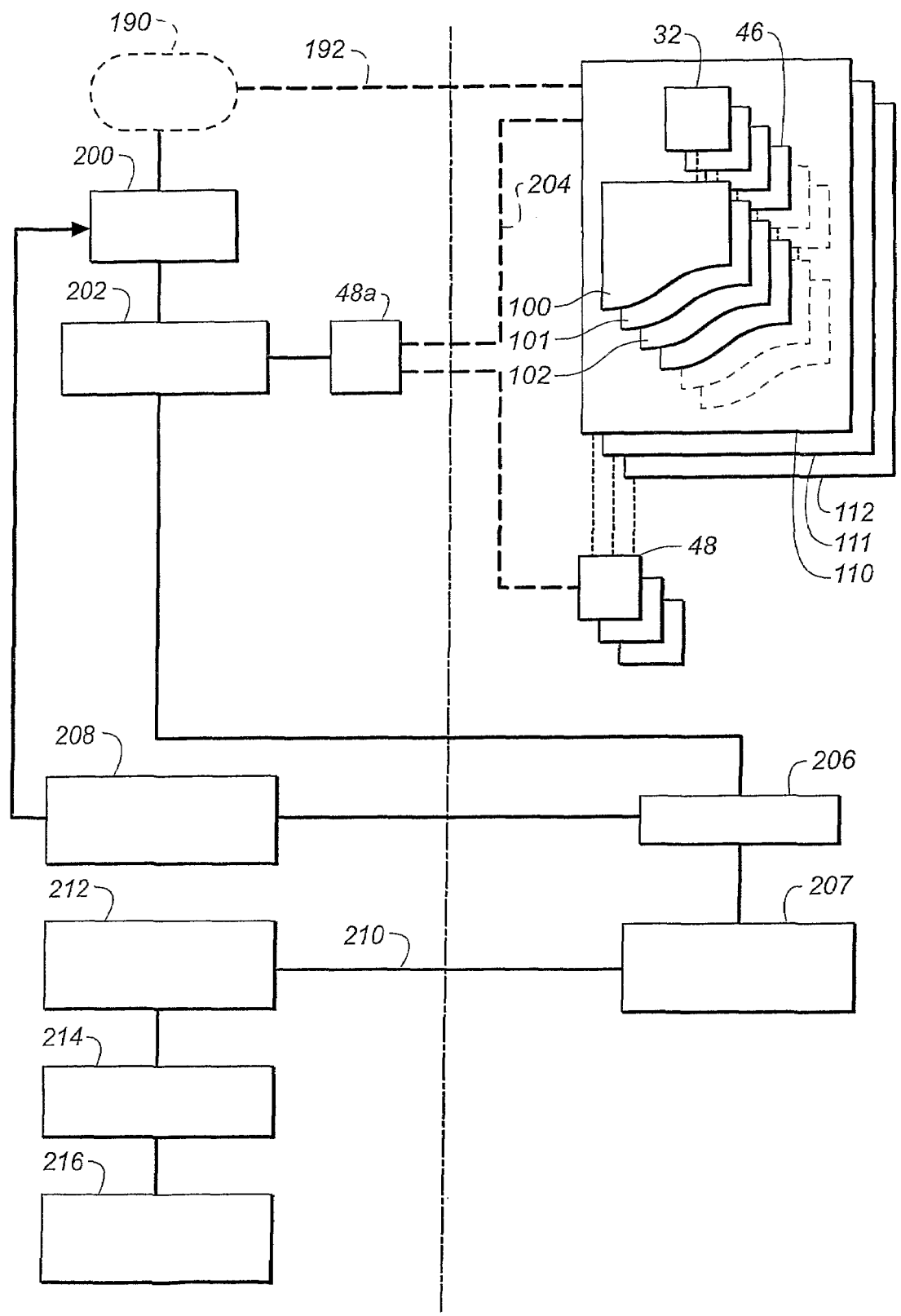
FIG. 2 is an organization diagram showing the main steps of a method according to the invention.

The use of image characteristics appears more clearly in the description that follows, with reference to FIG. 2, which shows the main steps of a method according to the invention.

On FIG. 2, a dot-and-dash line separates the steps that are implemented locally and appear on the left of the figure, and the steps that take place in the central distribution station and appear on the right of the figure. Some of the characteristic calculation steps, of taking local equipment displacements into account or formatting the display, can be executed either in the central distribution station or by the local equipment. The choice of the processing place is essentially decided by the calculation power of the local equipment and by the capacity of the communication link that it has with the central distribution station.

The central distribution station contains a lot of multimedia data capable of being requested by one or more users. The multimedia data are organized in data sets 100, 101, 102 that are linked to image characteristics 32, 46, etc. respectively. These are image characteristics that correspond to selection images capable of appearing on the selection supports given to users. In this case, they are selection image characteristics of the type already mentioned with reference to FIG. 1. The data sets are organized as subsets of data sets 110, 111, 112. Each subset of data contains, for example, all the data respectively accessible by a specific user. A subset of data can also correspond to all the data capable of being selected from the same support given to one or more users. Other groupings are possible.

Like the data sets, the subsets of data sets 110, 111, 112 are linked to image characteristics. In the example shown, one of the subsets 110 of data sets is linked to characteristic 48 that corresponds to that of set 28 formed by the images found on the support 10 of FIG. 1.

A first step 200, performed by the user, consists in capturing an image of the support sent to them. The capture is performed using the local equipment. For example, this is the capture of an image using the sensor of a phonecam.

The user can frame the captured image to cover all the selection images of the support, one particular selection image of the support, a subset of selection images, or part of a selection image only.

As soon as an image has been captured, the characteristic 48a of the image is created. The creation 202 of the characteristic takes place by calculation from the data supplied by the image sensor of the local equipment. A communication link 204 is also made with the central distribution station. This is a hertzian link and/or a link by communication network.

In the example shown, it is assumed that the user captures an image that corresponds more or less to all the images of the support 10 of FIG. 1. The characteristic 48a calculated from the captured image is not exactly the same as the characteristic 48 linked to these images in the central distribution station. This can be due, for example, to a slight framing fault, a slight support printing fault, a sensor faithfulness fault or to any other cause.

A comparison step 206 then takes place between the characteristic 48a created in response to the captured image and the characteristics of the data sets or subsets of data sets present in the memory of the central distribution station. In the present example, the comparison takes place first with the characteristics of the subsets of data sets.

The comparison takes place, for example, by calculating a difference function between the determined characteristic 48a and the characteristics present in the memory of the distribution station. The closest characteristics are then those that enable this function to be minimized. For example, when the image characteristics are pixels of the selection image of the support, it is possible to convolve these image data, or data of various image parts, with the characteristics present in the distribution station. The convolution product can be performed for various image resolutions. The minimum of the convolution product indicates the best match of the characteristics. Still in the present example, and although the characteristics 48a created in response to the capture of the image by the user are not exactly the same as the characteristics 48 of the first data set subset 110, it turns out that they are the closest to the latter.

It is thus confirmed that the images that the user is going to select using the available support must be looked for in the data set subset 110 thus determined.

An invitation 208 to restrict the field of view for capturing a selection image is sent to the local equipment. This invitation comes, for example, as an ad hoc display on the control screen of the local equipment.

The user can then re-center the framing around a selection image or a particular part of the selection image of the available support, and capture a new image using the sensor of the local equipment. The steps of capture 200 and characteristic calculation 202 are then repeated. A new image characteristic is created.

The new image characteristic is compared not with all the image characteristics stored in the central distribution station, but only with the image characteristics linked to the data set of the data set subset 110 previously selected.

So long as no specific data set is identified from the characteristics of the images captured by the local equipment, it is possible to simply display the images corresponding to the signal supplied by the sensor on the control screen of the local equipment. On the other hand, as soon as a match has been made between the characteristics of a captured image and the characteristics linked to a data set, the data set is transmitted from the central distribution station to the local equipment. The transmission is shown with the reference 210. It takes place after a step 207 of formatting the data for transmission. For example, this comprises an adjustment of the resolution for the image data. The data can be stored 212 in a temporary memory of the portable equipment. A display 216 on the control screen of the local equipment or on the screen controlled by the local equipment is then produced. The display can take into account other parameters, such as movements of the local equipment. The capture and taking into account of these movements are indicated with the reference 214.

When the multimedia data transmitted to the local equipment are data other than image data, such as sound data or graphic data, they can be reproduced concomitantly with the images captured in real time by the image sensor. For example, graphic or text data can be superimposed on the images that are captured and displayed. Sound data can be reproduced using a loudspeaker of the local equipment.

When the multimedia data are image data or video sequence data, the display of the images corresponding to these data can displace that of the image captured by the image sensor of the local equipment. In other words, when the multimedia data correspond to the selection image shown on the user's support, the equipment no longer reproduces an image from the capturing sensor data, but from the data supplied by the central distribution station. These data can correspond to images enhanced with comments or other information.

The data supplied by the central distribution station can be reproduced for as long as the portable equipment captures all or part of the image whose characteristics are linked to these data. A displacement range around the image of the support of the portable equipment can also be defined, so that, within this range, the data supplied by the central distribution station are reproduced.

To reduce the calculation time required to compare the characteristics of the captured images with the characteristics linked to the data sets saved in the central distribution station, it is useful to perform these comparisons for a limited number of data sets. This can take place in the way previously indicated by first capturing an overall image and by selecting a data set subset corresponding to this overall image.

Another solution, selected as an alternative or in addition, consists in inviting the user to enter an alphanumeric code, or barcode or any other type of code, that enables the singular and unambiguous determination of the data set subset of the central station for which the comparison of the image characteristics is required. The entry 190 of a code and its transmission 192 to the central station enable, for example, a set of photos captured on a similar occasion or relating to the same subject to be selected. On FIG. 1, a digital code of this type is indicated with the reference 194.

Figure 3:
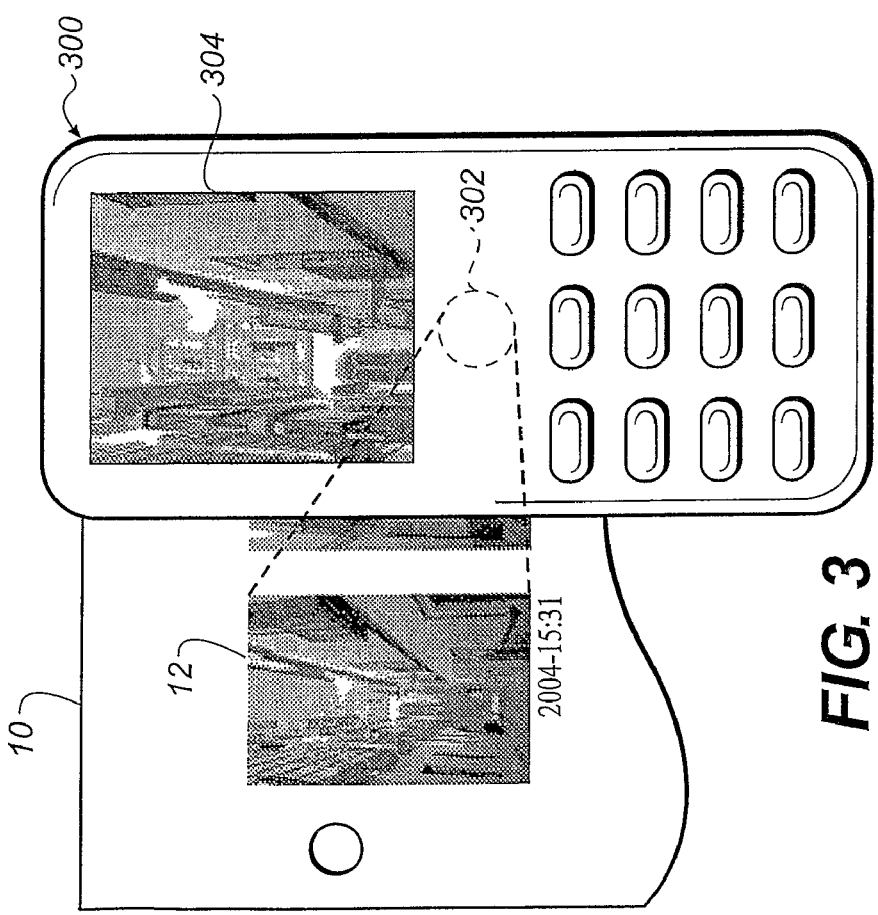
FIG. 3 shows an example of data reproduction in response to the capturing of an image of the support.

FIG. 3 illustrates a particular implementation of the method, in which the user captures an image 12 from the data support 10 of FIG. 1. The user moves the local equipment 300, in this case a mobile phone, towards the support 10 so that the image sensor 302 covers all or part of the image 12 shown on the support. As soon as the data of this image are identified in the central distribution station, they are transmitted to the local equipment 300. The control screen 304 of the local equipment then displays an image that corresponds to these data. It may be seen that the displayed image does not correspond exactly with the captured image but only to part of it, reproduced slightly enlarged. Detection of the displacement of the local equipment around the image 12 of the support is used to perform "navigation" in the corresponding image. Displacement detection can take place, in a known way, using accelerometers or based on the signal supplied by the image sensor, by using the sighted image as displacement target. For this, reference can be made, for example, to document (8) whose references are given at the end of the description.

Figure 4:
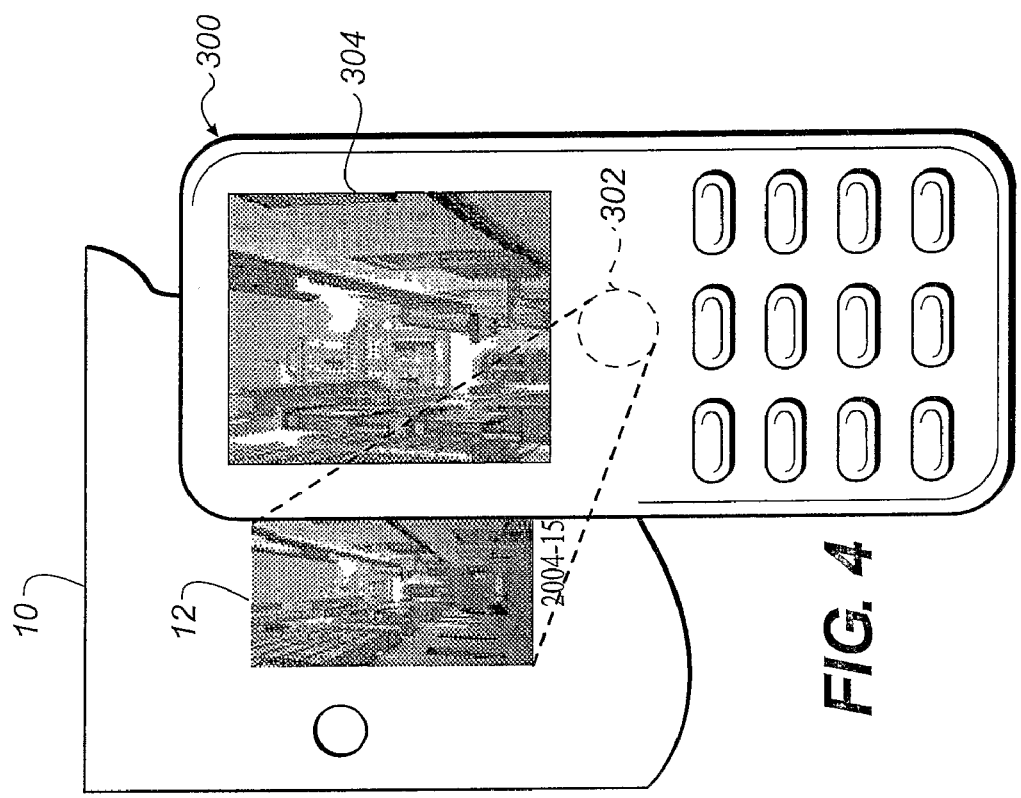
FIG. 4 shows another example of data reproduction in response to the capturing of an image of the support.

FIG. 4 shows another possible use of the data supplied by the central distribution station. The local equipment's distancing or closing movement with the support can be used to control the enlargement rate of the reproduced image. This movement can be also detected using accelerometers or the signal supplied by the image sensor 302.

When the image data supplied by the central distribution station correspond to a high resolution image, the user can then display details of the image that do not appear on the available support on the control screen of the local equipment. The user can thus use the equipment as a magnifying glass.

Figure 5:
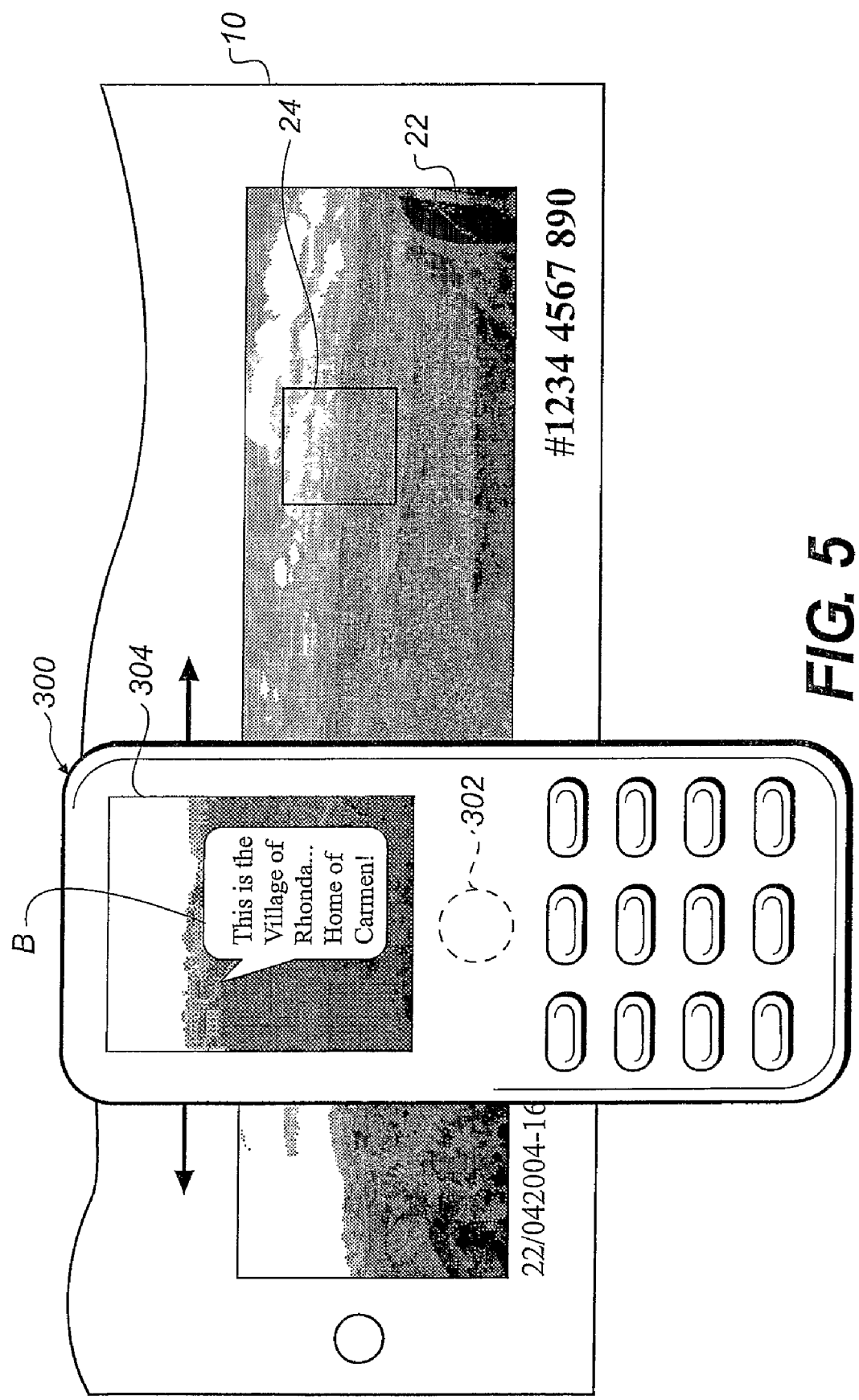
FIG. 5 shows yet another example of data reproduction in response to the capturing of an image of the support.

FIG. 5 shows yet another possibility offered by the described method. In the case of FIG. 5, the user captures the image 22 of the available support 10. The user can run over this image, or "navigate" in this image as previously shown by FIGS. 3 and 4. Thus, as soon as the image is identified from its characteristics, the display of the image on the control screen is no longer executed using the signal of the sensor 302, but using the data from the central distribution station.

By running over the image 22 of the support 10 using the local equipment, the sensor may capture parts 24, 26 of the image shown by the rectangles on FIGS. 1 and 5. These rectangles are not shown on the support given to the user. They are simply given on FIGS. 1 and 5 to show that particular multimedia data are linked to the characteristics corresponding to these image parts. When the characteristics of these image parts are created, the multimedia data are looked for in the central distribution station in the way previously mentioned.

In the example illustrated in the FIG. 4, the multimedia data linked to the image part captured by the local equipment is an annotation, in the shape of a screen tip B that is temporarily superimposed on the image and describes the contents.

The screen tip only appears on the local equipment's screen, while it does not appear on the image 22 of the user's support 10.

In a particular application of the invention, the support 10, rather than a photographic index sheet, can be a periodical or any other publication. In this case, the reference code 194 of FIG. 1 is, for example, the number of the publication or the newspaper's date of publication.

The user, not provided with adequate local equipment, or not having a subscription to a distribution service of data from a central station, can consult the newspaper illustrated with images normally.

The user, provided with suitable local equipment, can use the local equipment to capture the images of the newspaper or publication. In this case, the user benefits not only from the printed images illustrating the publication, but also from additional multimedia data linked to the image characteristics. For example, a video sequence of a story, or an extract of televised news can be started and reproduced on the portable equipment when it captures an image corresponding to the story subject.

Figure 6:
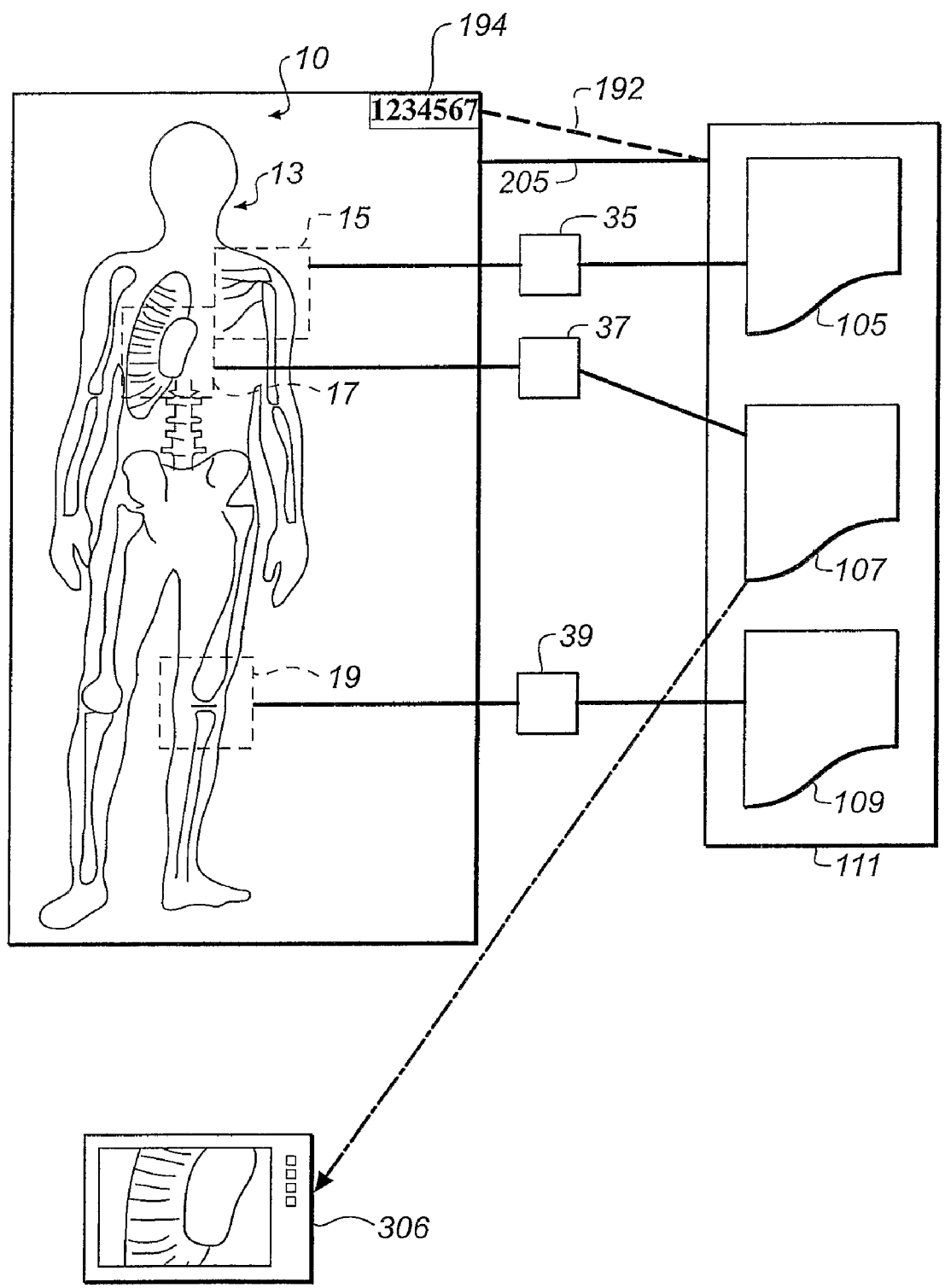
FIG. 6 shows a special application of the invention in the medical field.

On the same model, FIG. 6 shows an application of the invention in the medical imaging field. The support 10 is a patient's identification sheet containing an identification number 194. The capture of this number and its transmission 192 to the central distribution station enables a search to be made in the central distribution station within a subset 111 of data sets 105, 107, 109 that correspond to the medical images available for this patient.

The support 10 also shows an x-ray 13 or a photograph of all or part of the patient's body.

The x-ray 13 has image characteristics linked to the data set subset 111 that contains all the patient's medical images as well as the reports of analysis or previous medical consultations. The image characteristics can be created by the portable equipment when it captures an image that more or less covers the whole support 10. They then enable an appropriate data set subset 111 to be selected. The use of this selection method, linked to the capture of the above-mentioned digital code 194, enables a double check to be made thus avoiding a medical file error.

The practitioner can then scan the x-ray 13 and point the portable equipment to one part of the x-ray corresponding to the location of the patient's pathology. The characteristics of the images captured by the portable equipment's sensor are created and compared with those linked to various data sets of the previously determined data set subset 111.

Indeed, certain parts 15, 17, 19 of the x-ray 13 have characteristics 35, 37, 39 linked to data 105, 107, 109 such as more detailed x-rays or medical diagnoses.

In the illustrated example, one data set 107 corresponds to an x-ray of the heart or a video sequence showing the heart beating. They are directed to the practitioner's local equipment when the captured image has characteristics close to the characteristics 37 linked to these data. The data are not inevitably reproduced on the control screen of the local equipment but, in this case, on a monitor 306 linked to the local equipment and controlled by it.

The navigation and enlargement (zoom) functions mentioned above in relation to FIGS. 3 and 4 enable the practitioner to examine the patient's medical images more accurately and to have access to a lot of information.

It should be noted that the x-ray or photograph 13 present on the support can have very low resolution, and in any case much lower than that required for a medical diagnosis. This enables easy reproduction of the support and giving it to the patient or the practitioner. The resolution has simply to be sufficient to enable the characteristics of the image parts to be created and differentiated one from another. This condition is fulfilled using low quality printing.

The data relating to detailed medical images, with high resolution, come from the central distribution station and enable the practitioner to make a diagnosis.

The invention claimed is:

1. A method of distributing multimedia data from a central distribution station to local equipment (300), provided with an image sensor (302) and means to make a communication link with the central distribution station, the method comprising:

a) the linking of a plurality of image characteristics (32, 34, 36, 38, 40, 42, 44, 46, 48) respectively with a plurality of sets of multimedia data (100, 101, 102) stored by the central distribution station, b) the making available to at least one user of a support (10) having at least one selection image (12, 14, 16, 18, 20, 22) representative of the multimedia contents and of which one part at least has the image characteristic, c) in response to capture (200) of at least one image of the support by the local equipment, the automatic making of a communication link (204) between the local equipment and the central distribution station, and the calculation (202) of a characteristic of the captured image, d) the search (206) for a set of multimedia data of the central station linked to an image characteristic closest to the characteristic calculated in step c), e) the transfer of multimedia data to the local equipment and the reproduction to the user of the data, using the local equipment, the method further comprising:

f) the linking of at least one image characteristic (48) of an overall image to a group of several of said sets of multimedia data (110, 111, 112); and g) the sending of an invitation (208) to restrict an image capture field when the characteristic of the captured image corresponds to the characteristic of the overall image and wherein the search for a set of multimedia data is limited to the group of data sets corresponding to the overall image, upon a new capture of an image.

2. A method according to claim 1, wherein the digital data sets contain at least one from among: image data, data relating to an image part, to a plurality of images, data relating to video sequences, sound data, and data relating to annotated images.

3. A method according to claim 1, also comprising the reception by the central distribution station of an identifier (194) entered using the local equipment; the search of step d) being made among a subset of multimedia data sets (110, 111, 112) linked to the identifier.

4. A method according to claim 1, wherein the multimedia data relate to an image whose iconic contents correspond to the contents of the selection image shown on the support given to the user, and wherein part of the image is reproduced according to the position of the local equipment in relation to the support given to the user, to simulate navigation in an image with a size greater than that of a screen used for the reproduction.

5. A method according to claim 1, wherein the data correspond to one image and wherein part of the image is reproduced with an enlargement factor depending on the distance separating the local equipment and the support given to the user.

6. A method according to claim 1, wherein the local equipment is a digital camera or a mobile phone.

7. A method according to claim 1, wherein the multimedia data are image data, and wherein the reproduction of the data is executed on one from among a control screen (304) built into the local equipment, and a control screen (306) remote from the local equipment.

8. A method according to claim 1, wherein the image characteristic linked to the digital data and the calculated characteristic are functions of at least one from among: image color components, spatial intensity gradients of the image, spatial frequencies of the image or the image parts, a map of outlines of shapes contained in the image, and an image segmentation.

9. A method according to claim 1, wherein the support (10) given to the user is a newspaper, and wherein the representative images of the multimedia contents are images illustrating the newspaper.

10. A method according to claim 1, wherein the support (10) given to the user includes an x-ray print.

11. A method according to claim 1, wherein the support (10) given to the user is a photo index sheet.

* * * * *